Jan. 2, 1923.

H. C. BABEL.
INNER TUBE FOR TIRES.
FILED DEC. 15, 1921.

1,440,860

Inventor
Henry C. Babel,
By
Attorney

Patented Jan. 2, 1923.

1,440,860

UNITED STATES PATENT OFFICE.

HENRY CLAY BABEL, OF BUFFALO, NEW YORK.

INNER TUBE FOR TIRES.

Application filed December 15, 1921. Serial No. 522,608.

*To all whom it may concern:*

Be it known that I, HENRY CLAY BABEL, a citizen of the United States, residing at Buffalo, in the county of Erie and State of New York, have invented new and useful Improvements in Inner Tubes for Tires, of which the following is a specification.

The invention relates to an inner tube for tires.

The object of the present invention is to provide a simple, practical and efficient inner tube of strong and durable construction adapted to be employed as a substitute for ordinary inflated inner tubes for use in the outer tubes or casings of pneumatic tires of the clincher and other types and capable of eliminating tire troubles caused by punctures, blow-outs and the like without the use of metal armor or other hard material embedded in the material of the outer tube liable to cut or wear the tire and impair the resiliency of the same.

A further object of the invention is to provide an inner tube of this character provided with exteriorly opening self filling air pockets arranged to be covered or closed by the outer tube or casing and capable of affording the necessary pneumatic resiliency to absorb and dissipate the shocks and vibrations and relieve the body of a vehicle of the same.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction, within the scope of the claim, may be resorted to without departing from the spirit or sacrificing any of the advantages of the invention.

In the drawings, in which like characters of reference designate corresponding parts in the several views:—

Figures 1, 3:
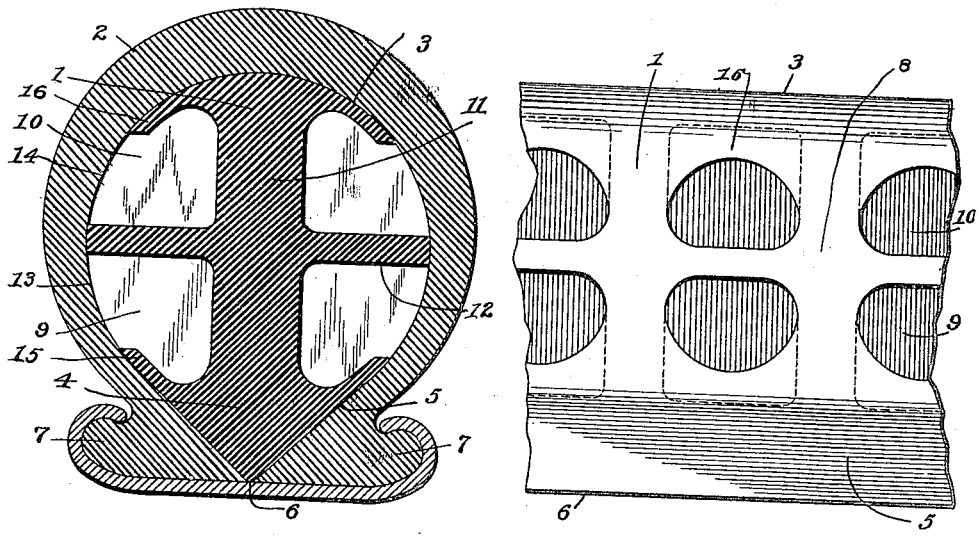
Figure 1 is a transverse sectional view of a tire of the clincher type, provided with an inner tube constructed in accordance with this invention.
Figure 3 is a side view of a portion of the inner tube.
Figure 2:
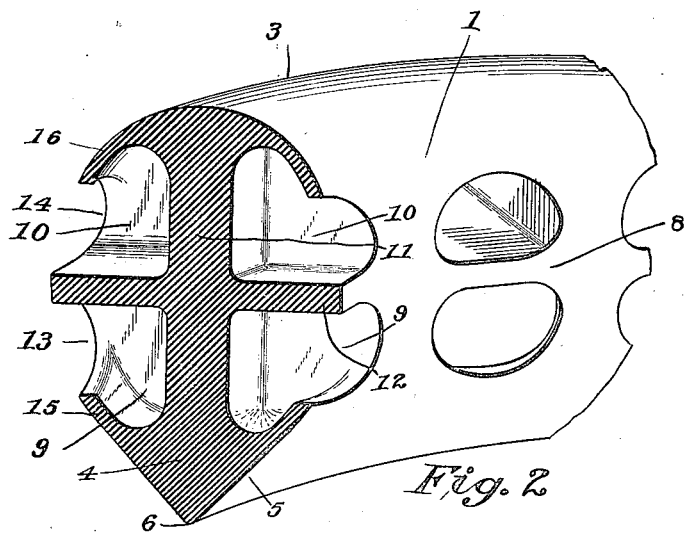
Figure 2 is a sectional perspective view of a portion of the inner tube.

In the accompanying drawing, in which is illustrated the preferred embodiment of the invention, 1 designates an inner tube consisting of an elastic body and preferably constructed of soft rubber of relatively high elasticity but the resiliency or elasticity of the inner tube may, of course, be varied to adapt the inner tube to the character of vehicle on which the inner tube is to be used. The inner tube 1 is arranged within an outer tube or casing 2 of any preferred construction, either of the clincher type or of any other design employing the usual removable inflatable inner tube and as the inner tube 1 is adapted to be substituted for an ordinary inner tube in the usual construction of outer tubes or casings and may be employed with any of the latter a detail description of the construction of the outer tube or casing 2 is deemed unnecessary. The inner tube 1 is preferably continuous and it is approximately circular in cross section, being provided with an outer transversely curved convex surface 3 located beneath and conforming to the configuration of the tread portion of the outer tube or casing 2 and the said inner tube has a transversely tapered inner portion or base 4 defined by approximately plane angularly related side faces 5 which form or define an inner central circumferential rib 6 which is interposed between the beads 7 of the base of the outer tube or casing, as clearly illustrated in Figure 1 of the drawing. The side faces 8 of the inner tube conform to the configuration of the inner faces of the side portions of the outer tube or casing and the latter is maintained in its inflated or distended condition so that the outer tube or casing when of the clincher type will be prevented from collapsing and will be maintained in engagement with the engaging portions or flanges of the rim of a wheel whereby there will be no liability of the tire becoming accidentally disengaged from the rim of the wheel on which it is mounted and will be held securely on the same until removed therefrom.

The inner tube is provided at opposite sides with inner and outer air pockets or chambers 9 and 10 located at opposite sides of the transverse and longitudinal central portions 11 and 12 of the inner tube, the said portions 11 and 12 separating the pockets and being formed by the same and providing intervening walls between the said pockets or chambers 9 and 10 and it will be readily apparent that by varying the size and numbers of the chambers or pockets 9 and 10 the amount of air contained within the inner tube may be varied and the elasticity of the inner tube may be controlled and the said inner tube may be made as elastic or as stiff as desired to adapt it for its intended use. The air chambers or pockets are open at their outer sides at 13 and 14 and have partial walls 15 and 16 located respectively at the lower portions of the inner series of pockets or chambers 9 and at the outer portions of the outer series of pockets or chambers 10. The open outer portions of the chambers or pockets enable the said chambers or pockets to fill automatically should the air be compressed from them and the size of the openings may be varied to control the action of the pockets or chambers. The open sides 13 and 14 in practice will be covered or closed by the outer tube or casing so that the air will be confined within the chambers or pockets and will cause a tire equipped with the inner tube of the present invention, to partake of the characteristics of a pneumatic tire and it will be clear that the inner tube 1 renders a tire puncture proof and that it is not subject to blow-outs and that tire trouble from such sources is entirely eliminated.

What is claimed is:

An inner tube designed for use in outer tubes or casings and consisting of an elastic body provided with inner and outer series of pockets or chambers arranged in pairs and provided at the outer sides with openings and having partial outer walls located respectively at the inner portions of the inner pockets or chambers and at the outer portions of the outer pockets or chambers, the openings of the pockets or chambers arranged to be covered by the outer tube or casing.

In testimony whereof I have hereunto set my hand.

HENRY CLAY BABEL.